(No Model.)
F. PRINZ.
LUBRICATOR.
No. 468,262. Patented Feb. 2, 1892.
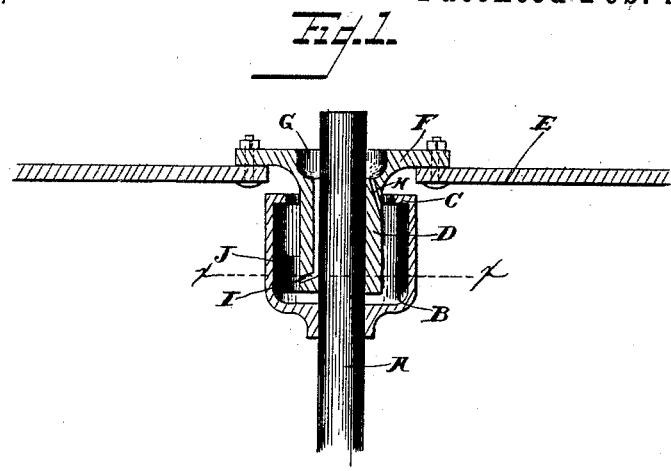
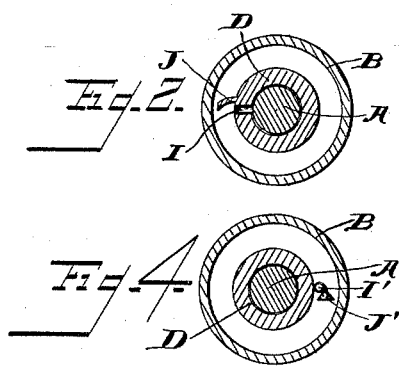
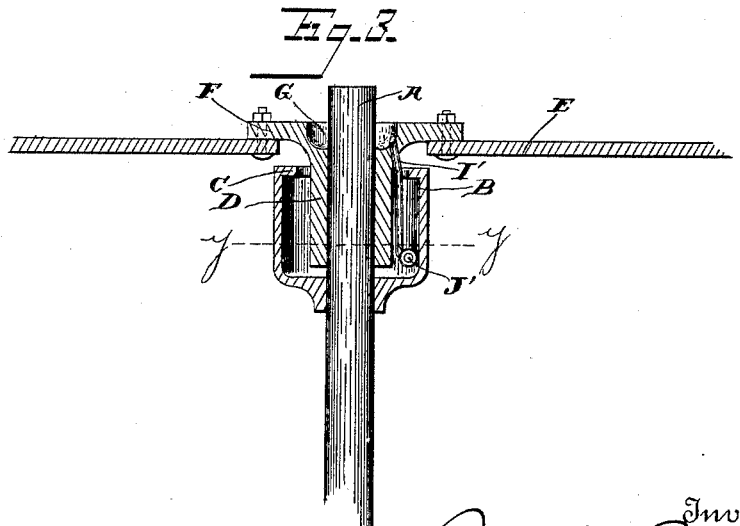
Witnesses
Inventor

UNITED STATES PATENT OFFICE.

FAUSTIN PRINZ, OF MILWAUKEE, WISCONSIN.

LUBRICATOR.

SPECIFICATION forming part of Letters Patent No. 468,262, dated February 2, 1892.

Application filed January 30, 1891. Serial No. 379,677. (No model.)

*To all whom it may concern:*

Be it known that I, FAUSTIN PRINZ, a subject of the Emperor of Germany, residing at Milwaukee, in the county of Milwaukee and State of Wisconsin, have invented certain new and useful Improvements in Lubricators; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to lubricators, and has for its object to insure the passing of the lubricant from the containing-cup to the shaft and to prevent the oil from running down the shaft outside the cup, for when it runs down the shaft it to some extent hardens and becomes sticky, and in that case there is danger, if the clothes of a person near the shaft comes in contact with the gummed oil on the shaft, of the clothes being pulled around with the shaft and the operator injured.

It has, further, for its object to provide for returning the lubricant to the cup to be used again.

Another object is to provide for carrying the lubricant-containing cup by the shaft to be lubricated, so that the shaft and cup will be revolved together.

Another object is to provide the opening through which the lubricant passes to the shaft with a shield or deflector, which will direct or deflect the lubricant into said opening.

To the accomplishment of the foregoing and such other objects as may hereinafter appear, means capable of effecting the same will now be fully described and the invention specifically defined by the claims, reference being had to the accompanying drawings, forming a part hereof, and in which—

Figure 1 is a side elevation of a shaft and its support having the invention applied thereto, parts being in section. Fig. 2 is a cross-section through the same on the line $x$ $x$ of Fig. 1. Fig. 3 is a view similar to Fig. 1 of a modified form of the invention. Fig. 4 is a cross-section on the line $y$ $y$ of Fig. 3.

In the drawings, the letter A designates a shaft to be lubricated, which will be supported in any well-known manner in a vertical position. This shaft is illustrated as carrying an oil or other suitable lubricant-carrying cup B, in this instance keyed or otherwise secured to the shaft to revolve therewith, and at one portion preferably provided with the inwardly-extending flange or cap C, designed to prevent the lubricant from being thrown out of the cup. The shaft A passes through a sleeve D, in this instance so as to turn therein, which sleeve may be supported in any suitable manner, it being illustrated as supported by a frame or platform E, upon which the flange F of the sleeve D rests, and through which flange bolts may pass to secure the sleeve to the frame. This sleeve is preferably formed with a cup-shaped recess G at its top, to receive the oil or lubricant that may work its way to that point from below, and a tube or orifice H, formed in the sleeve, will carry back into the cup B the lubricant that may collect in the recess G.

The lubricant in the cup B is fed to the shaft A through an aperture or orifice I, formed in the side of the sleeve, preferably near its lower end, and which is made to extend to the top of the sleeve, as shown; and in order that the lubricant in the cup may be directed into and caused to pass through the orifice I a projection or wing J is made to extend out from the side of the sleeve at or near the orifice and to within a short distance of the wall of the cup, so that when the oil strikes against that wing or projection in the rotation of the cup it will be deflected or thrown into the orifice and forced up the same and coming in contact with the shaft lubricate it throughout its bearing, and finally reaching the recess G will pass down through the return orifice or channel H to the cup B to serve for lubricating purposes, as before. The advantage of this projection or wing J will be apparent when it is borne in mind that the lubricant in the cup, by reason of centrifugal force, has a tendency to hug close to the wall of the cup B, and that unless some means be employed to bring it to the orifice I but very little, if any, of the lubricant will enter and pass through the orifice to the shaft. This projection or wing extending outward toward the wall of the cup, to which it may approach more or less closely, will catch or intercept the lubricant as it is carried around in the rotation of the cup and shaft and deflect it so that it will be thrown up against the sleeve and into the orifice leading to the shaft.

Instead of forming the orifice I in the body of the sleeve D, it may be made of a channel or tube I', extending up along the sleeve from its lower portion and opening into the recess G at the top of the sleeve, as illustrated in Fig. 3, from whence the oil which has passed up through the channel or tube will find its way back to the lubricating-cup by passing down the shaft between it and its sleeve, and on its way back lubricate the shaft. The lower end of this pipe may terminate adjacent to the wing or projection J the same as the channel or orifice I, formed in the body of the sleeve, so that the impact of the oil against the said wing or projection will direct it into the open lower end of the tube or chamber; but instead of having the wing or projection extend from the side of the sleeve it may be formed on the lower end of the tube, which is curved outwardly, as shown, said wing or projection in that event being preferably given the shape of a funnel, as indicated by the letter J'. This funnel-shaped wing or projection will extend close enough to the wall of the lubricating-chamber to have the oil strike against it in the rotation of the cup, the same as in the other form of wing or projection, and when the oil strikes against it it will be directed into the open end of the tube and forced upward by the same force as in the other form. An opening or channel similar to the channel H (illustrated in Fig. 1 of the drawings) might be used for the return of the surplus oil to the lubricating-cup; but such is not necessary, as when omitted the oil will return between the shaft and sleeve and lubricate the shaft on its return, as previously described.

Under the construction described, the lubricant-cup being carried around with the shaft, the oil is kept in motion, and when checked by coming against the wing of the sleeve is deflected, as previously set forth, and its entrance into the orifice leading to the shaft thus insured.

This improvement is particularly adapted to lubricating vertical shafts, and in it the lubricant is forced upward by the impact of the lubricant against the wing or projection. The quick succession of blows or force exerted on the lubricant presses the lubricant upward, so that it is lifted from the bottom to the top, and the whole is confined within the cup, except what is lifted to the top of the sleeve, which portion is again returned to the cup. The construction also effectually prevents the lubricant from running down the shaft, and so the danger to life or limb referred to in the first part of this specification is prevented.

I have described and shown what I regard as the best construction and arrangement of parts, but do not thereby mean to be understood as restricting myself thereto, as they may be varied without departing from the spirit of my invention.

Having described my invention and set forth its merits, what I claim is—

1. In a lubricator, the combination, with a journal or shaft to be lubricated, of a sleeve for the journal, provided with an orifice for the passage of the lubricant to the journal, a lubricant-cup secured to the journal to revolve therewith, and a stationary wing or projection in proximity to said orifice to catch or intercept the body of the lubricant that hugs to the wall of the cup, which by reason of its impact against said wing will be driven up through the orifice, substantially as and for the purposes set forth.

2. In a lubricator, the combination, with a journal or shaft to be lubricated and a cup to revolve therewith, of the sleeve for the journal, provided with an orifice for the passage of the lubricant, the lower portion of the orifice being deflected outwardly, and a stationary wing or projection extending sufficiently near to the wall of the cup to cause an impact between the projection and the lubricant, which hugs to the wall of the cup sufficient to drive the lubricant up said orifice, substantially as and for the purpose set forth.

In testimony whereof I affix my signature in presence of two witnesses.

FAUSTIN PRINZ.

Witnesses:
R. L. DINGWALL,
JOHN H. MANSCHOT.